Nov. 4, 1924.　　　　　　　　　　　　　　　　1,514,192
G. H. BAUSMAN
PISTON ROD PACKING
Filed Jan. 15, 1924
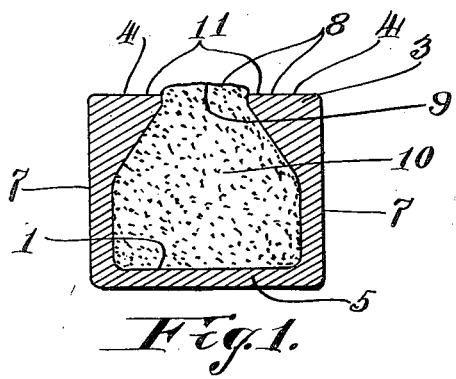
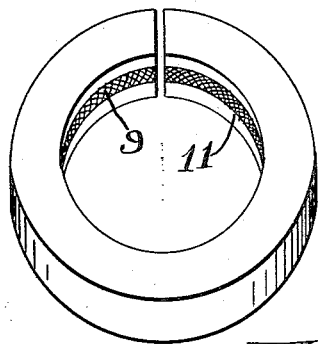
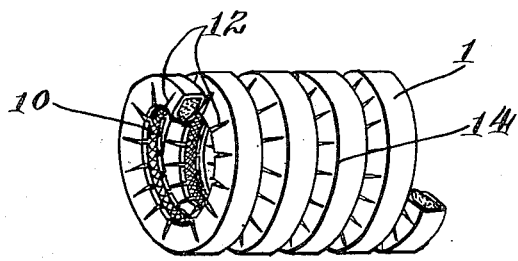
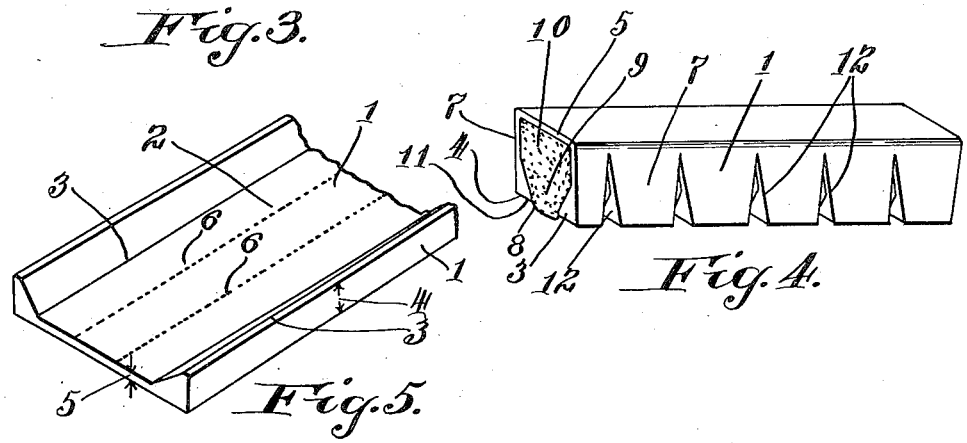
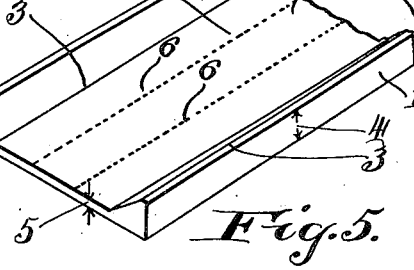

Patented Nov. 4, 1924.

1,514,192

UNITED STATES PATENT OFFICE.

GEORGE H. BAUSMAN, OF BALTIMORE, MARYLAND.

PISTON-ROD PACKING.

Application filed January 15, 1924. Serial No. 686,280.

*To all whom it may concern:*

Be it known that I, GEORGE H. BAUSMAN, a citizen of the United States of America, residing in the city of Baltimore, State of Maryland, have invented certain new and useful Improvements in Piston-Rod Packings, of which the following is a specification.

The packing which is the subject of the invention is particularly adapted for use as a piston rod packing for air pumps, steam engines, ammonia compressors, and any and every variety of pump piston rod, and may be variously applied within the scope of my invention.

In accordance with the present practice, fabric packings of asbestos and graphite or rubberized duck, flax or the like, are used for these purposes. They have proved unsatisfactory in almost every instance because steam, air, water, or acids, or other fluids being handled, are brought in contact with the packing on every side, and this contact soon results in the disintegration of the packing, and aside from the disintegration resulting from the action of the fluids handled, the soft packing is quickly disrupted by the action of the moving parts, so that it has to be replaced at extremely short intervals and requires constant attention in the way of frequent tightening of the packing box or gland.

The difficulties thus presented have been greatly diminished or completely overcome by means of my present invention, which consists in a relatively soft fabric packing of asbestos and graphite, or other suitable materials, as rubberized duck or flax, or whatever may be found available for this purpose, enclosed within a casing of soft bearing metal, as lead or some of the softer alloys, which protects the fabric packing from steam, air, acids, etc. and supports it, preventing or retarding disintegration, only a relatively narrow surface of the fabric or non-metallic packing being exposed to contact with the piston rod or other moving metal surface to be packed.

As shown, the casing is of rectangular cross-section, the opening through which the non-metallic packing is exposed extending along the centre of one of the sides of the casing, but the shape is not material and the edges of the soft metal casing are preferably thickened at each side of the opening to prevent excessive wear of the metal adjacent the exposed surface of the fabric.

While the sides of my metal casing may to advantage be continuous, I have also shown them as formed with a series of V-shaped slots which tend to close when the packing is formed in a ring or spiral, making it feasible to bend the packing to fit almost any diameter of piston rod, this packing being sold in the form of a spiral, as the various fabric packings are sold, so that it can be cut off in different lengths and applied to piston rods of different diameters, the metal and fabric packing of my invention in which the sides of the casing are continuous and not slotted, being less flexible, so that this is made in separate rings of different diameters adapted to fit piston rods of corresponding diameters only.

In the accompanying drawings I have illustrated a piston rod packing in accordance with my invention.

In the drawings—

Figure 1 is a transverse cross-section through the packing on an enlarged scale.

Figure 2 is a perspective view of a packing ring constructed in accordance with my invention.

Figure 3 is a perspective view showing a length of packing in the form of a spiral, the sides of the casing being slotted to give increased flexibility and provide for the application of the packing cut in different lengths to piston rods of various sizes.

Figure 4 is a perspective of a piece of the packing slotted to give increased flexibility, as aforesaid, the packing in this instance being shown straight, so that the slots are open.

Figure 5 is a perspective of a metal slip from which the casing may be formed.

Referring to the drawings by numerals, each of which is used to indicate the same or similar parts in the different figures, the packing in the preferred form as illustrated, consists of an elongated rectangular casing 1, of soft metal, as lead or some similar soft bearing metal or alloy. This casing may be formed of a metal strip 2, see Figure 5, by bending it transversely to a rectangular or other suitable cross-section. This strip 2, as shown, has its longitudinal edges 3 of increased thickness as compared to the central portion of the strip, and is given a reducing taper from the extreme thickness of the edges 4 to the normal thickness of the central portion at 5. In bending the strip or otherwise forming the casing, the edge portions of the strip outside the dotted lines 6, 6 in Figure 5, are bent upward, forming the side walls 7 of what may be termed a U-shaped or channel-shaped casing, the thickened edges 4 of the strip 2 causing what would otherwise be the open side 8 of the U or channel-shaped casing to be partially closed, and leaving a longitudinally-extending opening 9 therein at the centre of this side extending the full length of the casing where the soft packing or filler strip 10, which may be of asbestos and graphite, or any suitable packing material as rubberized duck or flax, or the like, is exposed flush with the outside surface 11 of the casing, or possibly due to the intense pressure under which the completed packing is formed, normally slightly protruding therefrom.

The opening 9 between the thickened edges 4 is preferably about a third of the width of the casing. The thickening and tapering of the casing at this point reduces the wear and provides a suitable support for the filler or soft packing 10 right up to the edges of the opening, which filler or soft packing is ordinarily of circular cross-section.

The packing thus prepared may be sold and used in the form of rings bent to fit the various sizes of piston rods with which it is to be used, the open side 11 of the casing exposing the surface of the soft packing being placed on the inside surface of the ring, so that it engages the piston rod, it being of course understood that the rings thus formed are placed in the stuffing box about the rod in sufficient numbers to fill the box, and are suitably compressed by tightening the packing nut.

The practice of selling heavy fabric packing or other similar heavy packing in the helical form, so that it may be cut off in suitable lengths and applied to piston rods of various sizes, is generally known. The metal covered packing just described is less flexible than the average fabric packing and can be handled to the best advantage in the form of rings fitting the particular sizes of piston rods with which it is to be used, but the packing of the present invention has been made available for sale in the helical form or otherwise, so that it can be cut to suitable lengths and applied to piston rods of various sizes by slotting the sides 7 of the casing and the thickened edges 4 thereof, the slots 12 being preferably of the V or wedge shape whereby the packing is rendered much more flexible and capable of being bent by hand to fit piston rods of any diameter. Preferably the slots are staggered to prevent blowing through the packing.

In Figure 4 I have shown a straight piece of metal encased packing, the metal casing being thus slotted as to the sides to make it more flexible, and in Figure 3 I have shown the packing similarly slotted but bent in the form of a helix 14, the slots 12 being closed or substantially closed by bending the packing into the circular or helical form. In the helical form as well as in the ring, the side 11 with the opening 9 exposing the surface of the soft packing is turned inward.

In operation the stuffing box is filled with rings of the packing, either the slotted form cut from the helix or other supply in suitable lengths to form rings of the desired diameter or with rings furnished to size as illustrated in Figure 2, the sides of the casing in the latter instance being unslotted, as change of curvature when the rings have once been formed, is unnecessary except in opening and closing them to pass the rod. The stuffing box or gland when thus filled is duly closed and the nut tightened, compressing the packing in the usual manner.

Under these circumstances the thickened edges 4 of the metal and the portion of the soft packing exposed at the opening 9 engage the rod, and the bearing metal thus engaging the rod, serves to protect the soft packing not only from steam, water, acid and other fluids being pumped, but it also serves to support the soft packing in its original form, retarding the wear and preventing disintegration of the packing, which with the ordinary fabric packing used in the stuffing boxes of steam engines, piston rods, air pumps, ammonia pumps, and the like, is extremely rapid. On the other hand, with the improved article it has been found that the air pump of a locomotive will run for several months without attention to the packing. The metal engaging the rod has the effect of a metallic packing taking up the greater portion of the wear and the fabric packing carries the lubricant and prevents dripping of the condensed moisture.

Having thus described a metal and fabric packing embodying my invention specifically and in detail, and the manner of using the same, I would have it understood that the specific terms herein are used descriptively rather than in a limiting sense, the scope of the invention being defined in the claims.

What I claim and desire to secure by Letters Patent is:

1. A piston rod packing consisting of a metal casing of channel-shaped cross-section containing a filler of non-metallic packing exposed between the edges of the channel, the edges of the channel being thickened so that the exposed portion of the non-metallic packing is less than the full width of the channel.

2. A piston rod packing consisting of a metal casing of channel-shaped cross-section, a non-metallic packing in said casing and exposed flush with the edges of the channel, the sides and edges of said channel being slotted so that the packing may be bent to any desired diameter, the packing being curled and the edges turned inwardly.

3. A packing in the form of a helix and consisting of an elongated metal casing of channel-shaped cross-section having a non-metallic packing therein exposed between the edges of the channel, the edges of the channel being thickened and tapered internally, and the sides and edges of the channel being slotted.

4. A packing in the form of a helix and consisting of an elongated casing of soft metal and of channel-shaped cross-section having a non-metallic packing therein exposed between the edges of the channel, the edges of the channel being thickened and tapered internally, and the sides and edges of the channel being slotted.

5. A packing in the form of a helix and consisting of an elongated metal casing of channel-shaped cross-section having a non-metallic packing therein exposed between the edges of the channel, the edges of the channel being thickened and tapered internally, and the sides and edges of the channel being slotted, the slots being staggered.

Signed by me at Baltimore, Maryland, this 14th day of January, 1924.

GEORGE H. BAUSMAN.

Witnesses:
PORTER H. FLAUTT,
E. WEHMEYER.